(12) United States Patent
Takachi et al.

(10) Patent No.: US 7,871,346 B2
(45) Date of Patent: Jan. 18, 2011

(54) BICYCLE DERAILLEUR

(75) Inventors: Takeshi Takachi, Osaka (JP); Satoshi Shahana, Osaka (JP); Yoshitsugu Yamada, Shiga (JP)

(73) Assignee: Shimano, Inc., Osaka (JP)

( * ) Notice: Subject to any disclaimer, the term of this patent is extended or adjusted under 35 U.S.C. 154(b) by 414 days.

(21) Appl. No.: 12/059,400

(22) Filed: Mar. 31, 2008

(65) Prior Publication Data

US 2009/0247334 A1  Oct. 1, 2009

(51) Int. Cl.
F16H 59/00 (2006.01)
(52) U.S. Cl. .............................. 474/78; 474/80; 474/82
(58) Field of Classification Search .................. 474/78, 474/80, 82
See application file for complete search history.

(56) References Cited

U.S. PATENT DOCUMENTS

| | | | | |
|---|---|---|---|---|
| 5,618,241 | A | * | 4/1997 | Ose .............................. 474/80 |
| 6,287,228 | B1 | * | 9/2001 | Ichida .......................... 474/82 |
| 7,614,972 | B2 | * | 11/2009 | Oseto ........................... 474/82 |
| 2004/0110587 | A1 | * | 6/2004 | Shahana et al. ................ 474/80 |
| 2006/0058135 | A1 | * | 3/2006 | Shahana ....................... 474/82 |

FOREIGN PATENT DOCUMENTS

| | | |
|---|---|---|
| BE | 462 675 A | 2/1946 |
| BE | 512 567 A | 7/1952 |
| FR | 2 587 079 A | 3/1987 |
| JP | 54-009853 | 1/1979 |
| JP | 54-047247 A | 4/1979 |
| JP | 54-047248 A | 4/1979 |
| JP | 54-072831 A | 6/1979 |
| JP | 55-029695 A | 3/1980 |
| JP | 55-127272 A | 10/1980 |
| JP | 55-140678 A | 11/1980 |
| JP | 55-148676 A | 11/1980 |
| JP | 55-148677 A | 11/1980 |
| JP | 62-099291 A | 5/1987 |

* cited by examiner

Primary Examiner—Sang Kim
(74) Attorney, Agent, or Firm—Global IP Counselors, LLP (57) ABSTRACT

A bicycle derailleur includes a mounting member, at least one linkage member, a movable chain guide and a chain guide tensioning mechanism. The mounting member is configured to be attached to a bicycle frame. The linkage member is supported to the mounting member. The movable member is movably coupled to the mounting member via the linkage member. The chain guide is pivotally connected to the movable member to pivot about a pivot axis that extends through the movable member. The chain guide also supports a guide pulley and a tension pulley. The chain guide tensioning mechanism is supported to the movable member at a point spaced apart from the pivot axis configured to bias the chain guide in a direction about the pivot axis.

19 Claims, 13 Drawing Sheets

BICYCLE DERAILLEUR

BACKGROUND OF THE INVENTION

1. Field of the Invention

This invention generally relates to a bicycle rear derailleur. More specifically, the present invention relates to a bicycle rear derailleur with a chain guide tensioning mechanism.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

Typically, bicycle rear derailleurs are designed to change the position of a bicycle chain such that the chain can be positioned to engage any one of a plurality of differing diameter chain sprockets. On many bicycles, a shifter mechanism installed to a bicycle handlebar is manipulated to apply tension to an adjuster cable that extends between the shifter mechanism and the rear derailleur. Changes in the tension on the adjuster cable cause the cable to pull on portions of the rear derailleur. Appropriate portions of the rear derailleur then guide the chain to move accordingly to a different chain sprocket.

Such rear derailleurs typically include a mounting member, a pair of linkage members, a movable member and a chain guide. The mounting member is usually mounted to a portion of a frame of the bicycle. The linkage members are usually connected to the mounting member for pivoting movement with respect thereto. The movable member is usually supported on the linkage member such that the movable member is moveable relative to the mounting member via the pivoting movement of the linkage members. The chain guide is usually supported on the movable member such that the movable member and the chain guide are selectively movable to different positions, corresponding to the locations of the chain sprockets. The chain guide is usually pivotable about a pivot axis that extends through the movable member. A spring member typically biases the chain guide in a direction such that the chain is tensioned by the biasing force of the spring member. The chain is tensioned in order to keep the chain engaged with the chain sprockets.

Spring members used to bias the chain guide usually apply a near linear force to the chain guide. Specifically, the force applied by the spring member increases linearly with angular displacement of the chain guide. Some cyclists have found that as the force on the coil spring increases with angular displacement of the chain guide, friction between the chain and the sprocket also increases which may cause low drive efficiency, rapid wear of sprocket tooth and chain shifting between chain sprockets becomes more difficult.

In view of the above, it will be apparent to those skilled in the art from this disclosure that there exists a need for an improved chain tensioning arrangement that reduces the force applied to the chain by the chain guide. This invention addresses this need in the art as well as other needs, which will become apparent to those skilled in the art from this disclosure.

SUMMARY OF THE INVENTION

One object of the present invention is to provide a chain guide with a biasing force that does not increase linearly throughout the shifting process.

Another object of the present invention is to provide a chain guide with an attenuated biasing force.

The foregoing objects can basically be attained by providing a bicycle derailleur with a mounting member, at least one linkage member, a movable member, a chain guide and a chain guide tensioning mechanism. The mounting member is configured to be attached to a bicycle frame. The at least one linkage member is supported to the mounting member. The movable member is movably coupled to the mounting member via the at least one linkage member. The chain guide is connected to the movable member to pivot about a pivot axis extending through the movable member and supporting a guide pulley and a tension pulley. The chain guide tensioning mechanism has a biasing element with a linear displacement/force response. The chain guide tensioning mechanism is configured to bias the chain guide in a direction such that biasing force of the biasing element is applied to the chain guide with a non-linear displacement/force response.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
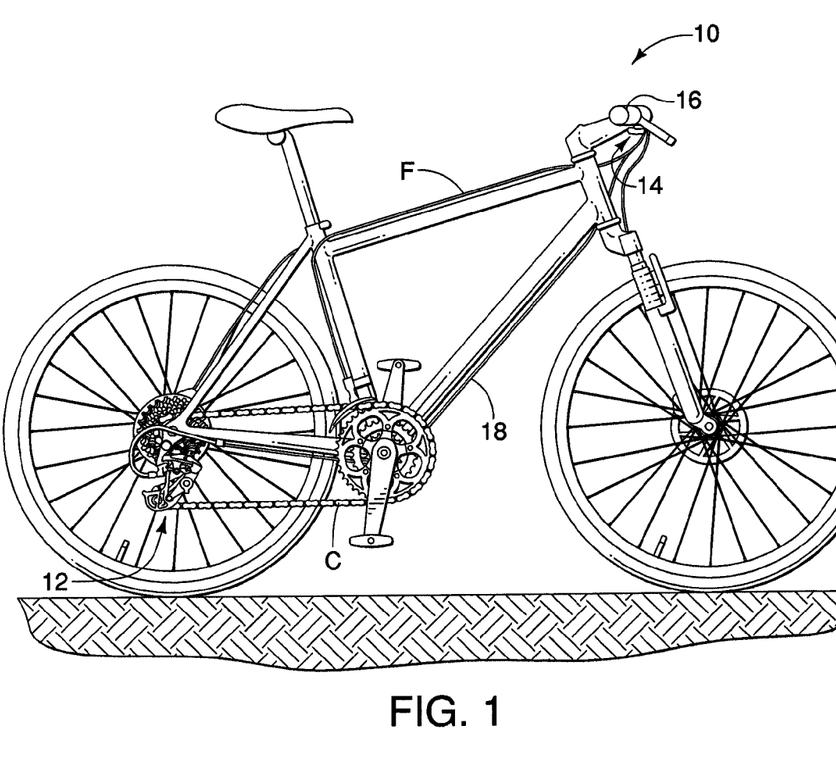
FIG. 1 is a side view of a bicycle showing a rear derailleur mounted to a rear section of a frame of the bicycle in accordance with a first embodiment of the present invention.

Referring initially to FIG. 1, a bicycle 10 with a rear derailleur 12 is illustrated in accordance with a first embodiment of the present invention.

The bicycle 10 basically includes (among other things) a frame F, a shifter mechanism 14 installed to a handlebar 16 of the bicycle 10 and the rear derailleur 12. A Bowden-type cable 18 extends between the shifter mechanism 14 and the rear derailleur 12 in a conventional manner. It should be understood from the drawings and the description herein that the shifter mechanism 14 and Bowden-type cable 18 can also be replaced with a hydraulic shifter and a hydraulic line (not shown).

Figure 2:
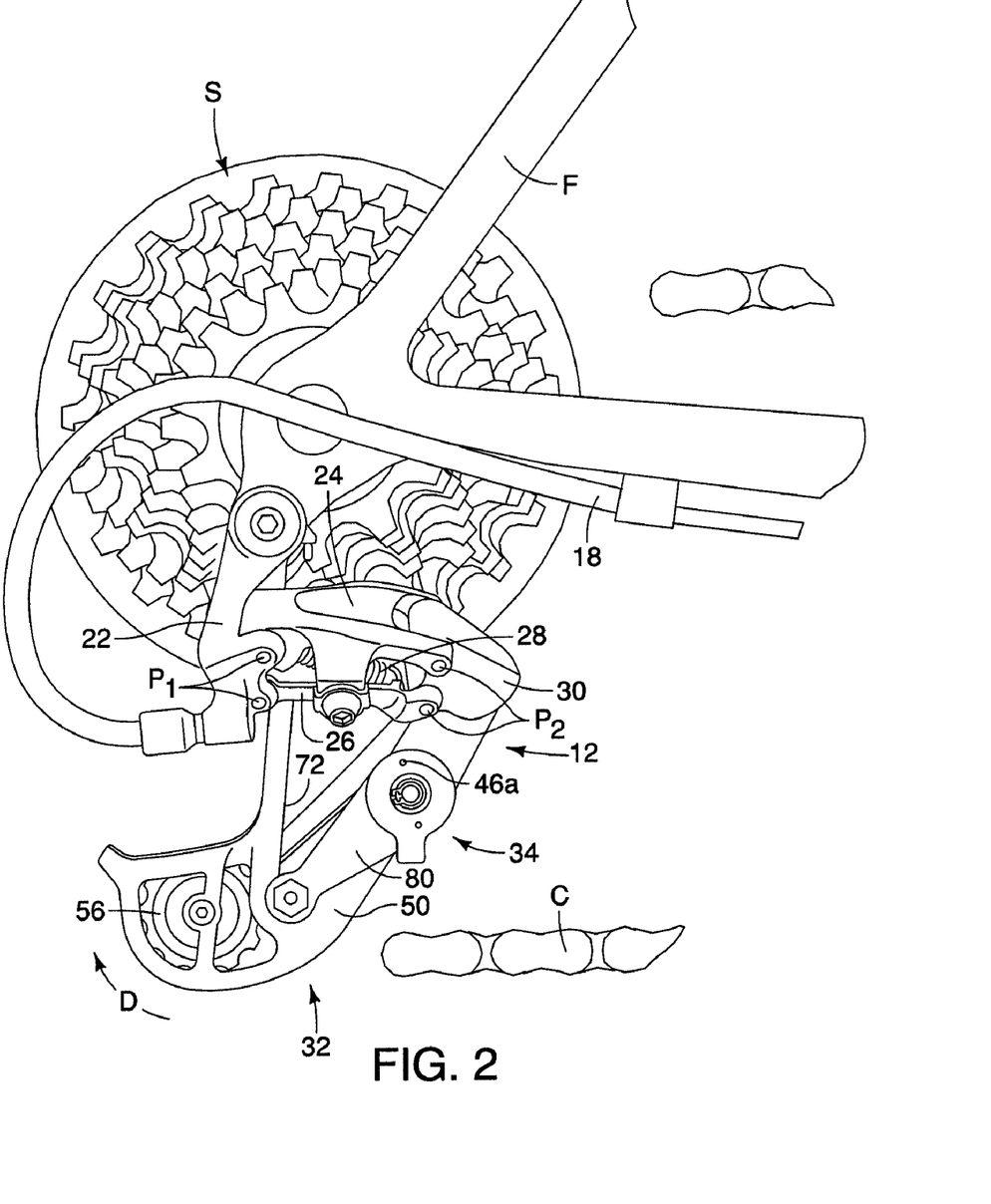
FIG. 2 is an enlarge view of the rear section of the frame of the bicycle showing details of the rear derailleur in accordance with the first embodiment of the present invention.

As best shown in FIG. 2, the rear derailleur 12 is attached to a rear section of the frame F of the bicycle 10. The rear derailleur 12 is configured to move a chain C between selected ones of a plurality of gear sprockets of a gear sprocket assembly S.

Figure 3:
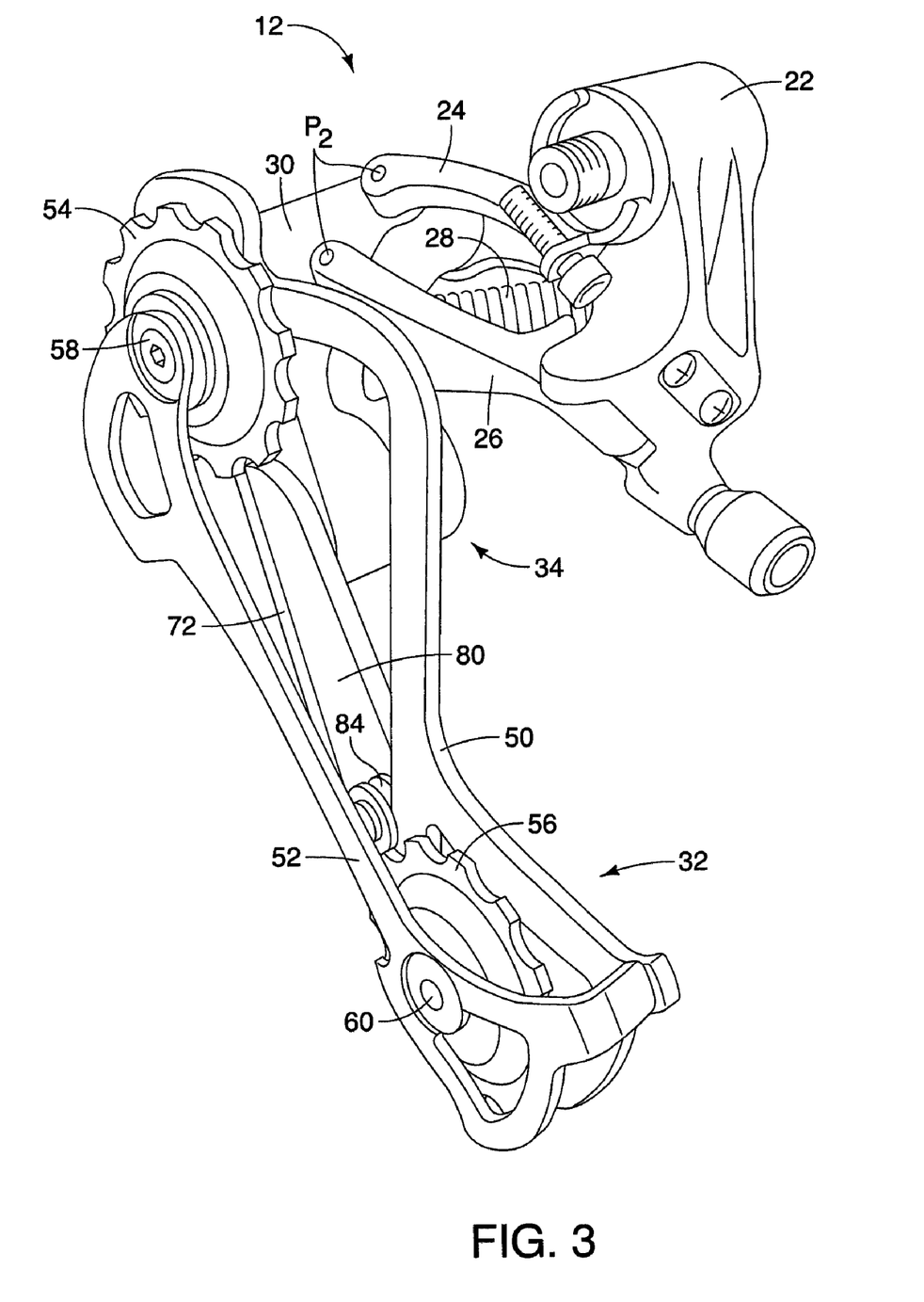
FIG. 3 is a perspective view of the rear derailleur shown removed from the bicycle in accordance with the first embodiment of the present invention.
Figure 4:
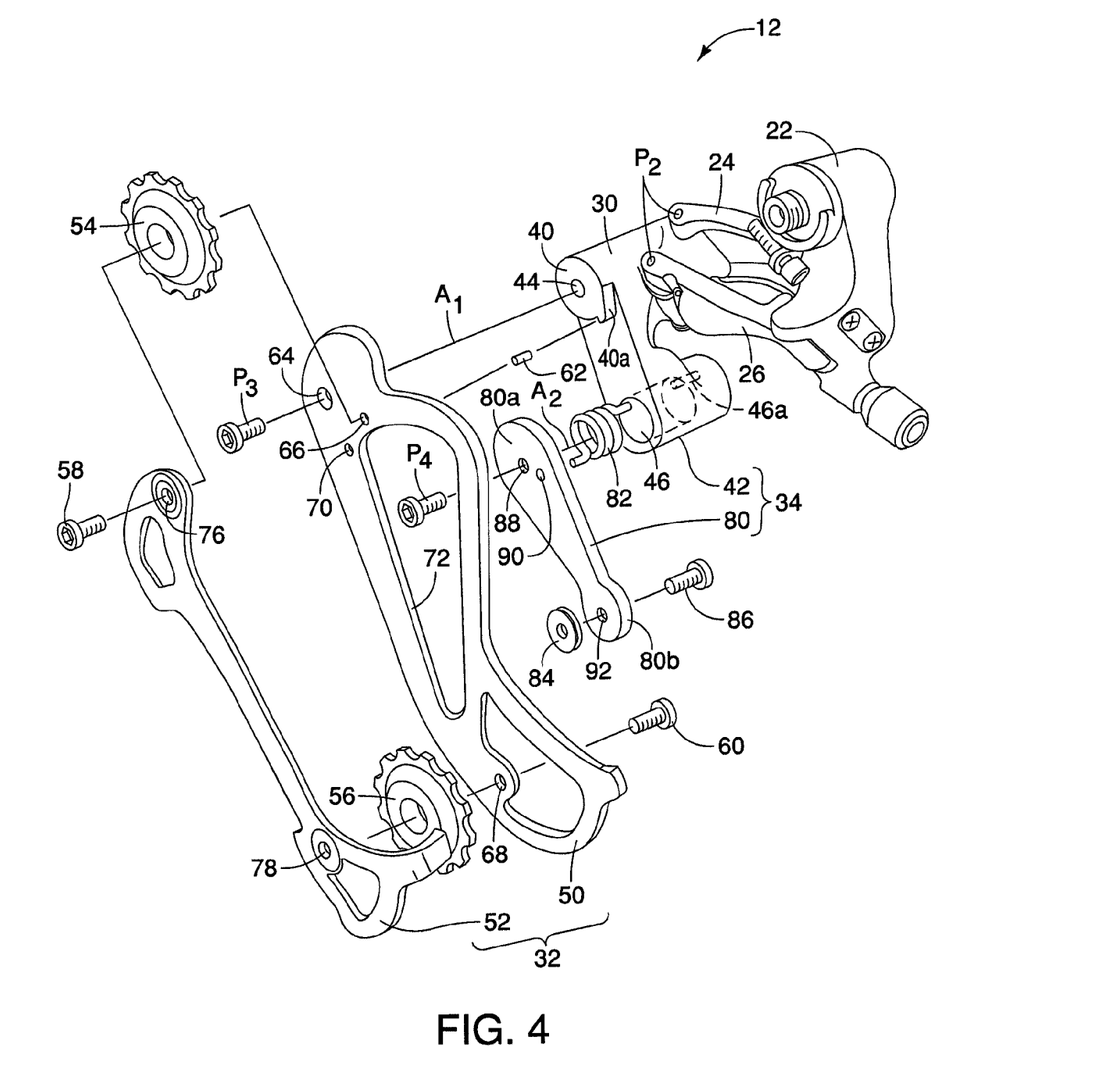
FIG. 4 is an exploded perspective view of the rear derailleur shown removed from the bicycle showing a movable member, a pair of linkage members, a movable member, a chain guide with a contacting surface that is straight and a chain guide tensioning mechanism with a lever and a coil spring in accordance with the first embodiment of the present invention.
Figure 5:
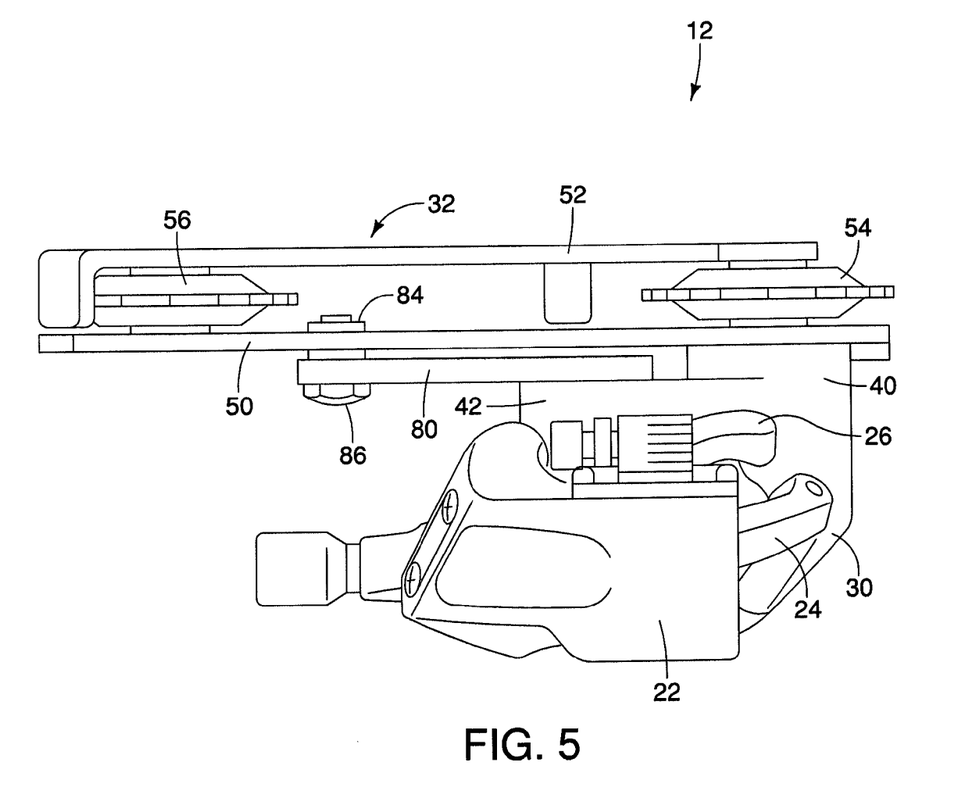
FIG. 5 is a top view of the rear derailleur shown removed from the bicycle in accordance with the first embodiment of the present invention.

A description of the rear derailleur 12 is now provided with specific reference to FIGS. 2, 3 and 4. The rear derailleur 12 basically includes a mounting member 22, a first linkage member 24, a second linkage member 26, a return spring 28 (FIGS. 2 and 3), a movable member 30, a chain guide 32 and a chain guide tensioning mechanism 34.

The mounting member 22 is a conventional rear derailleur component that can be attached to the rear portion of the frame F of the bicycle 10. The first linkage member 24 and the second linkage member 26 are supported to the mounting member 22 in a conventional manner. The first linkage member 24 and the second linkage member 26 pivot about parallel pivot pins $P_1$ that extend through the mounting member 22 in a conventional manner, as shown in FIG. 2. The return spring 28 (FIGS. 2 and 3 only) extends between the mounting member 22 and the movable member 30 to bias the movable member 30 to move in a direction opposite the direction of movement caused by the pulling force of the Bowden-type cable 18. The return spring 28 is only depicted in FIGS. 2 and 3 and has been omitted from other drawings in order to reveal details of adjacent elements.

The movable member 30 includes pivot pins $P_2$ that extend through a portion of the movable member 30 and corresponding portions of the first and second linkage members 24 and 26. Hence, the movable member 30 is movably coupled to the mounting member 22 via the first and second linkage members 24 and 26.

As best shown in FIG. 4, the movable member 30 includes a main body 40 and tensioning support portion 42. The main body 40 includes a stop shoulder 40a and an aperture 44 that is dimensioned to receive a pivot pin $P_3$. A first pivot axis $A_1$ extends through and is centered within the aperture 44 such that with the pivot pin $P_3$ installed in the aperture 44, the first pivot axis $A_1$ and the pivot pin $P_3$ coincide with one another. The pivot pin $P_3$ is threadedly coupled to the main body 40 of the movable member 30 such that the pivot pin $P_3$ pivotally supports the chain guide 32 about the first pivot axis $A_1$ The chain guide 32 is pivotally connected to the movable member 30 to pivot about the first pivot axis $A_1$ that extends through the movable member 30.

The tensioning support portion 42 includes an aperture 46 having a small aperture 46a deep within the aperture 46. The small aperture 46a is depicted in phantom in FIG. 4, but is also visible in FIG. 2. A second pivot axis $A_2$ extends through the aperture 46 and with a pivot pin $P_4$ installed in the aperture 46 such that the second pivot axis $A_2$ and the pivot pin $P_4$ coincide with one another. The pivot pin $P_4$ is threadedly coupled to the tensioning support portion 42 of the movable member 30 such that the pivot pin $P_4$ pivotally supports a tensioning member 80 about the second pivot axis $A_2$ that extends through the tensioning support portion 42 of the movable member 30. The first and second pivot axes $A_1$ and $A_2$ are preferably parallel to one another.

A description of the chain guide 32 is now provided with specific reference to FIG. 4. The chain guide 32 basically includes an outer cage plate 50, an inner cage plate 52, a guide pulley 54, a tension pulley 56, shaft pins 58 and 60 and a stop pin 62.

The outer cage plate 50 is preferably an elongated metallic plate-like member that includes a pivot pin aperture 64, shaft apertures 66 and 68, a stop pin aperture 70 and a contacting surface 72. The pivot pin aperture 64 is dimensioned to receive the pivot pin $P_3$. Hence, with the pivot pin $P_3$ installed in the pivot pin aperture 64 and the aperture 44 of the main body 40 of the movable member 30, the chain guide 32 is pivotable about the first pivot axis $A_1$.

The shaft aperture 66 is dimensioned to receive the shaft pin 58 and thereby support the guide pulley 54. The shaft aperture 68 is dimensioned to receive the shaft pin 60 and thereby support the tension pulley 56. The stop pin aperture 70 receives the stop pin 62 preferably in a press fit engagement. The stop pin aperture 70 and the stop pin 62 are positioned spaced apart from the first pivot axis $A_1$ to limit pivoting movement of the chain guide 32. More specifically, the stop pin 62 is positioned to contact the stop shoulder 40a of the main body 40 of the movable member 30. Thus, the chain guide 32 can undergo limited pivoting movement about the first pivot axis $A_1$ and relative to the main body 40 of the movable member 30.

The contacting surface 72 is a straight or linear surface of the outer cage plate 50 whose purpose is described in greater detail below along with a description of the chain guide tensioning mechanism 34.

The inner cage plate 52 is preferably an elongated metallic plate-like member that is almost the same length as the outer cage plate 50. The inner cage plate 52 includes shaft apertures 76 and 78. The shaft aperture 76 is dimensioned to receive the shaft pin 58 and thereby support the guide pulley 54. The shaft pin 58 also serves to attach or fix the inner cage plate 22 to the outer cage plate 50. The shaft aperture 78 is dimensioned to receive the shaft pin 60 and thereby support the tension pulley 56. The shaft pin 60 also serves to fix the inner cage plate 22 to the outer cage plate 50.

The guide pulley 54 and the tension pulley 56 are conventional chain engaging elements that include bearings (not shown) allowing the guide pulley 54 and the tension pulley 56 to rotate about respective ones of the shaft pins 58 and 60.

A description of the chain guide tensioning mechanism 34 is now provided with continued reference to FIG. 4. The chain guide tensioning mechanism 34 basically includes the tensioning member 80, a biasing element 82, a roller 84, a shaft pin 86, the pivot pin $P_4$ and the tensioning support portion 42 of the movable member 30. The tensioning member 80 is configured to contact the contact surface 72 of the chain guide 32 to apply the biasing force of the biasing element 82 to the chain guide 32.

The tensioning member 80 is basically a lever arm that includes a first portion 80a and a second portion 80b. The first portion 80a includes an aperture 88 that is dimensioned to receive the pivot pin $P_4$ and a spring aperture 90 dimensioned and positioned to receive one end of the biasing element 82. Hence, the first portion 80a of the tensioning member 80 is supported to the tensioning support portion 42 of the movable member 30 for pivotal movement about the second pivot axis $A_2$ that is spaced apart from the first pivot axis $A_1$. The second portion 80b includes an aperture 92 that is dimensioned to receive the shaft pin 86. The shaft pin 86 is installed to the second portion 80b of the tensioning member 80 and further supports the roller 84 to the second portion 80b at a distal end of the tensioning member 80. The roller 84 includes an internal bearing assembly (not shown) such that the roller 84 rotates relative to the shaft pin 86. Alternatively, the roller 84 may be omitted. In such case, the tensioning member 80 directly contacts the contact surface 72 of the chain guide 32.

The biasing element 82 is depicted as a metallic coil spring in FIG. 4. One end of the biasing element 82 is confined within the small aperture 46a deep within the aperture 46 of the tensioning support portion 42 of the movable member 30. The other end of the biasing element 82 is confined within the spring aperture 90 of the first portion 80a of the tensioning member 80. Consequently, as the tensioning member 80 pivots about the second pivot axis $A_2$, torque or biasing force is applied by the biasing element 82 to the tensioning member 80. Further, with the rear derailleur 12 fully assembled, the biasing element 82 is pre-tensioned and applies the biasing force via the roller 84 to the contacting surface 72 of the chain guide 32. The contact surface 72 of the chain guide 32 is configured for contact with the tensioning member 80 via the roller 84. Hence, the chain guide 32 is biased to pivot in a direction D about the first pivot axis $A_1$ relative to the movable member 30, as indicated in FIG. 2. The biasing force applied by the biasing element 82 keeps the chain C tensioned and in contact with a selected one of the gear sprocket of the gear sprocket assembly S.

It should be understood from the drawings and the description here in that the biasing element 82 can have any of a variety of configurations. For example, the biasing element 82 can be a pneumatic assembly that compresses a gas and generates a biasing force from the compressed gas. Alternatively, the biasing element 82 can be a metallic spring that is compressed, stretched or twisted (torque applying).

In the depicted embodiment, the biasing element 82 is a metallic coil spring that is twisted in order to generate the required biasing force. Preferably, the biasing element 82 applies a generally linear displacement/force response. In other words, in response to one end being twisted relative to the other end, the biasing element 82 responses by linearly increasing the biasing force it applies. For instance, during angular displacement (twisting), the amount of force required to twist the biasing element 82 increases at a rate that is approximately linear relative to the angular displacement of one end to the other end.

Figure 17:
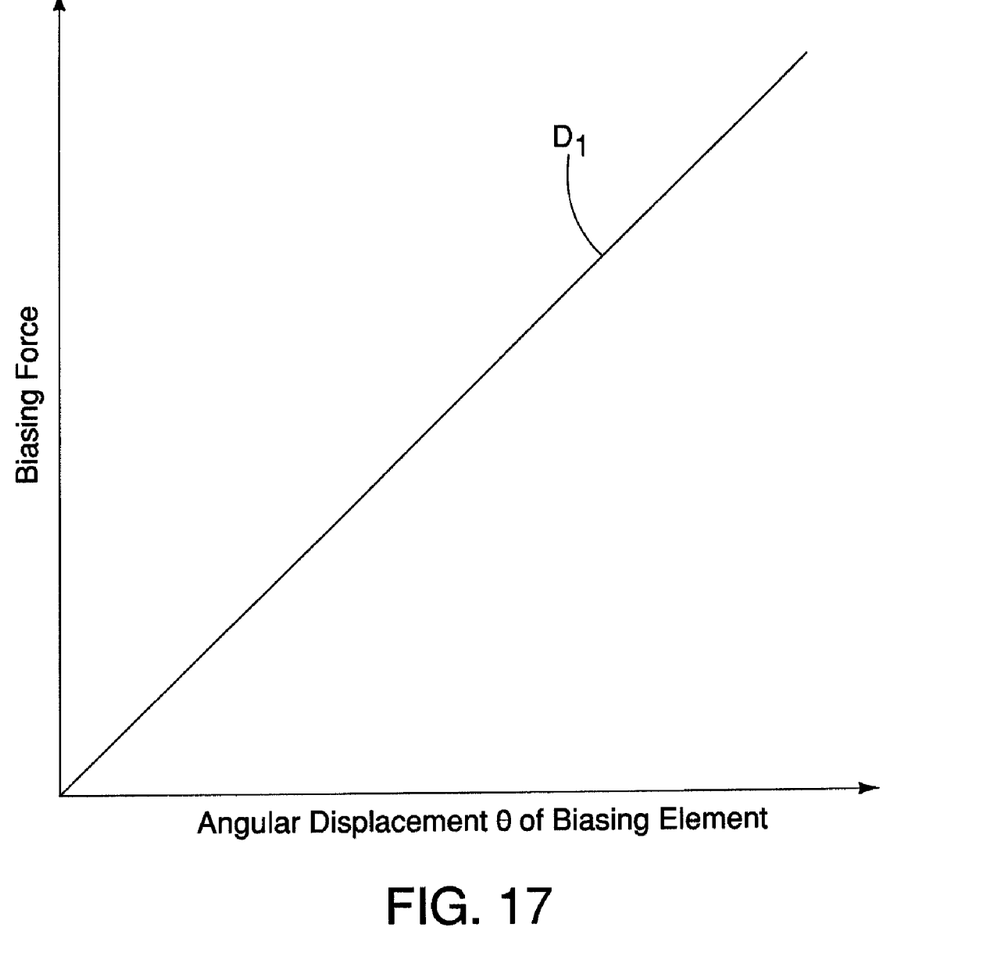
FIG. 17 is a schematic chart showing angular displacement of biasing element and theoretical biasing forces applied to a tensioning member (displacement/force responses)

It should be understood by those skilled in the art from the drawings, the description and basic engineering principles that mechanical elements such as the biasing element 82 (coil spring) are not perfect and do not necessarily exhibit ideal responses. The force of the biasing element 82 applied to the tensioning member 80 is schematically represented in FIG. 17 by the line $D_1$, which is a straight line. However, the line $D_1$ represents an ideal response, not necessarily the actual response. In other words, the line $D_1$ is a representation of an ideal spring and an ideal linear response, and does not necessarily represent a measured or actual displacement/force response of the biasing element 82. It should be understood by those skilled in the art from this disclosure that even though the measured or actual displacement/force response for some biasing elements is not completely linear, if such deviation is caused by an inevitable cause, such as friction, and there's no additional means for intentionally changing displacement/force response, such response is considered to be a "linear" response as used herein.

As can be seen from the line $D_1$ in FIG. 17, the greater the angular displacement of the biasing element 82, the greater the force or torque the biasing element 82 applies to the tensioning member 80.

As described above, the tensioning member 80 includes the roller 84. The roller 84 is biased by the biasing force of the biasing element 82 into contact with the contacting surface 72 in the direction D shown in FIG. 2. As best shown in FIGS. 6-10 (a reverse angle relative to the depiction in FIG. 2), the roller 84 is further positioned and configured to roll along the contacting surface 72 in response to pivoting movement of the chain guide 32. Since the roller 84 is able to roll along the contacting surface 72 of the chain guide 32, the force applied by the biasing element 82 to the tensioning member 80 is transferred to the chain guide 32. However, the tensioning member 80 pivots about the second pivot axis $A_2$ which is spaced apart from the first pivot axis $A_1$ of the chain guide 32. Therefore, the amount of force applied by the biasing element 82 to the tensioning member 80 is not necessarily the same as the force applied by the tensioning member 80 to the contacting surface 72 of the chain guide 32. More specifically, the biasing force of the biasing element 82 is applied to the chain guide 32 via the tensioning member 80 with a non-linear displacement/force response.

Figure 18:
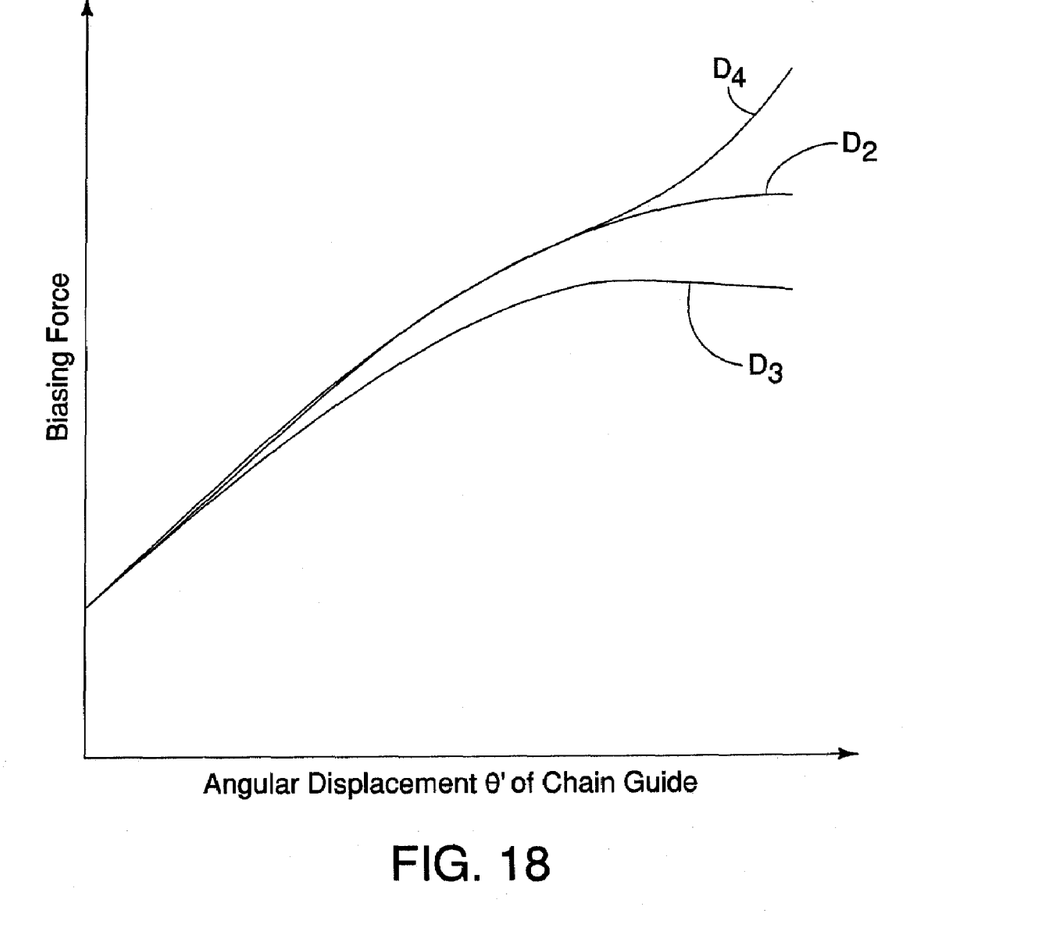
FIG. 18 is a schematic chart showing angular displacement of chain guides and theoretical biasing forces applied to chain guides by chain guide tensioning mechanism of the rear derailleurs (displacement/force responses) in accordance with the various embodiments of the present invention.

The line $D_2$ in FIG. 18 represents an approximation of the force applied from the tensioning member 80 to the chain guide 32 as the chain guide 32 moves from a rest position (θ'=0) where the stop shoulder 40a and the stop pin 62 contact in a direction opposite to the direction D in FIG. 2. For instance, at the left hand side of the chart in FIG. 18, there is a low amount of force applied by the tensioning member 80 to the chain guide 32. The left hand side of the chart in FIG. 18 corresponds roughly to the position of the chain guide 32 in FIG. 6. When the chain guide 32 moves between the positions shown in FIGS. 6 and 7 (a small displacement angle), the amount of force applied by the tensioning member 80 to the chain guide 32 is approximately linear, as indicated by the left-hand section of the line $D_2$ in FIG. 17. However, once the chain guide 32 moves to a position proximate the position depicted in FIG. 8 (a moderately large displacement angle), the amount of force applied by the tensioning member 80 to the chain guide 32 no longer increases linearly, but rather is attenuated. Specifically, as the chain guide 32 moves between the positions depicted in FIGS. 9 and 10 (large displacement angles), the force applied by the tensioning member 80 to the chain guide 32 remains about the same, as indicated in the right hand portion of the chart in FIG. 18.

As mentioned above, the line $D_1$ represents a theoretical displacement/force response of the biasing element 82. The line $D_1$ is not a measurement of the actual displacement/force response of the biasing element 82. An actual displacement/force response of the biasing element 82 would likely include small deviations from the linear depiction. The line $D_2$ represents a theoretical or an approximation of the displacement/force response of the tensioning member 80 acting on the chain guide 32.

The inclusion of the tensioning member 80 with the structure of the rear derailleur 12 causes the amount of force acting on the chain guide 32 to be attenuated. Specifically, the configuration of the tensioning member 80 makes it possible to use the biasing element 82 with an approximately linear displacement/force response but apply the force of the biasing element 82 via the tensioning member 80 to achieve a non-linear displacement/force response.

As can be observed by comparing FIGS. 6-10, the angular displacement of the chain guide 32 causes corresponding movement of the tensioning member 80. Specifically, as the chain guide 32 moves, the roller 84 rolls along the contact surface 72 and the tensioning member 80 responds accordingly. However, since the pivot axis $A_1$ of the chain guide 32 is spaced apart from the pivot axis $A_2$ of the tensioning member 80, the angular displacement of the chain guide 32 is not always the same as the angular displacement of the tensioning member 80.

Figure 6:
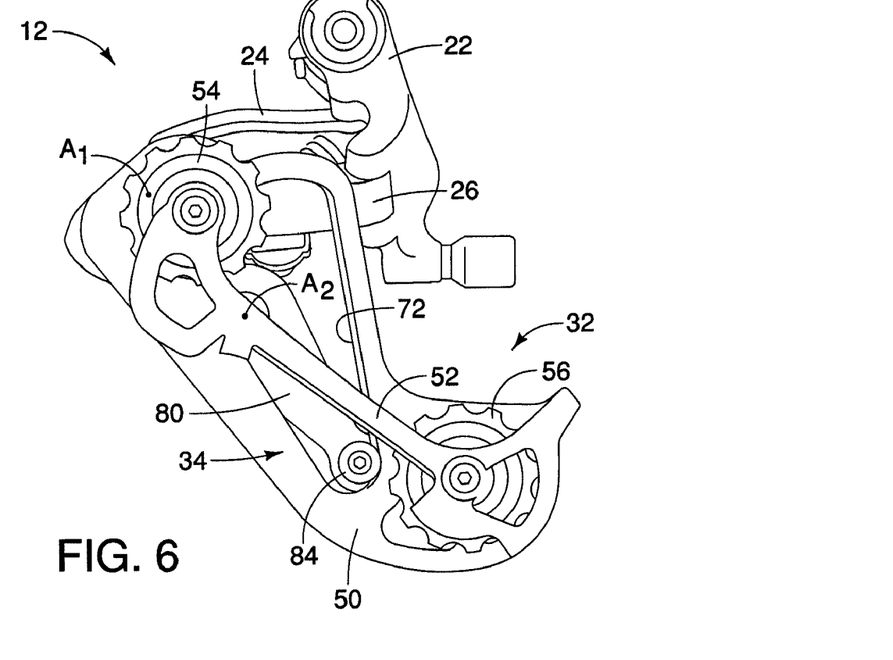
FIG. 6 is a side elevational view of the rear derailleur showing the chain guide and the chain guide tensioning mechanism is a first force applying position in accordance with the first embodiment of the present invention.
Figure 7:
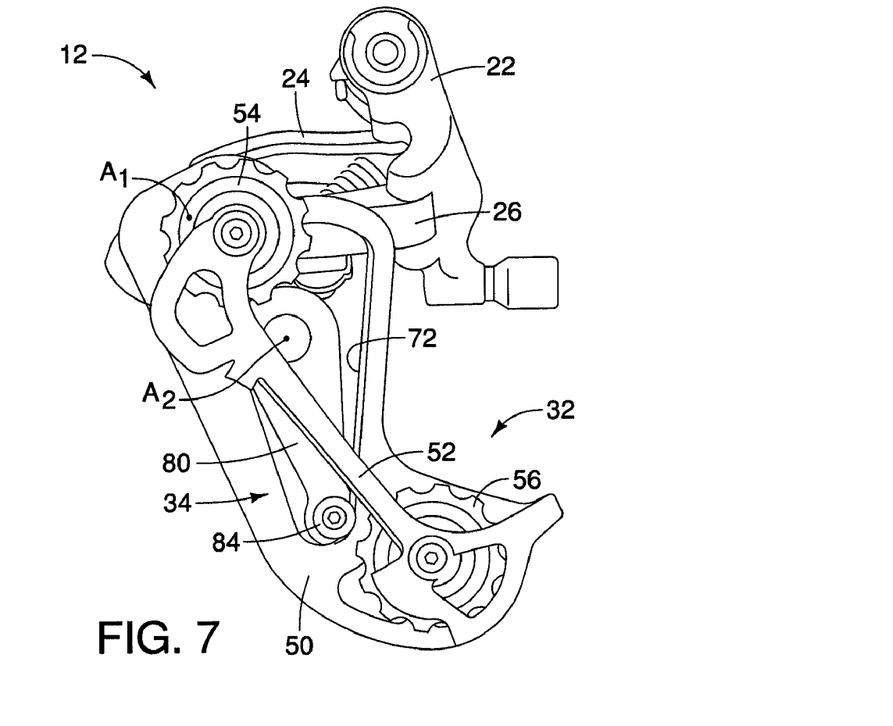
FIG. 7 is a side elevational view of the rear derailleur showing the chain guide and the chain guide tensioning mechanism is a second force applying position in accordance with the first embodiment of the present invention.
Figure 8:
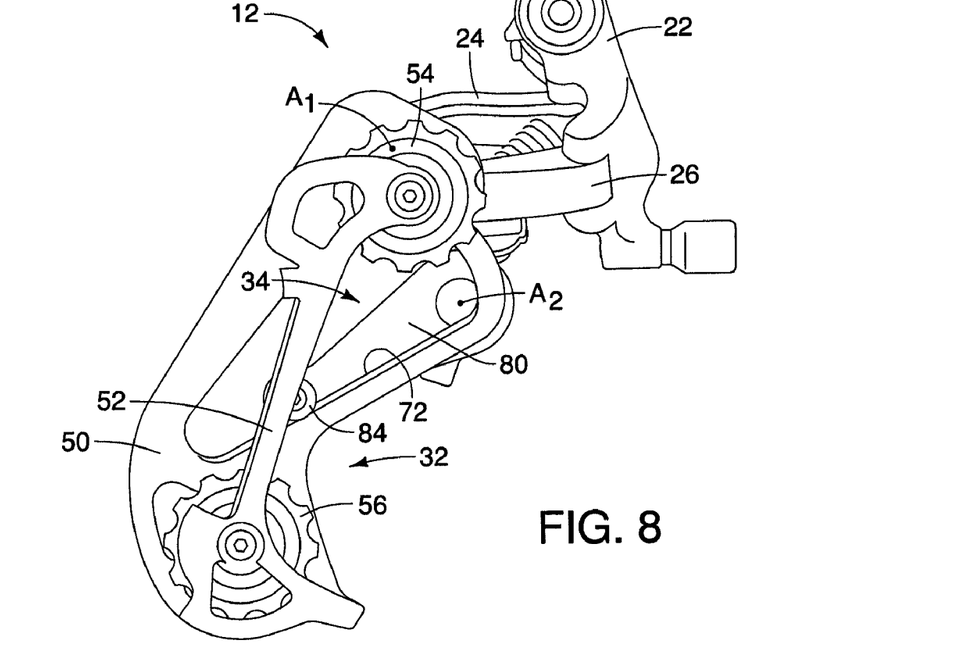
FIG. 8 is a side elevational view of the rear derailleur showing the chain guide and the chain guide tensioning mechanism is a third force applying position in accordance with the first embodiment of the present invention.
Figure 9:
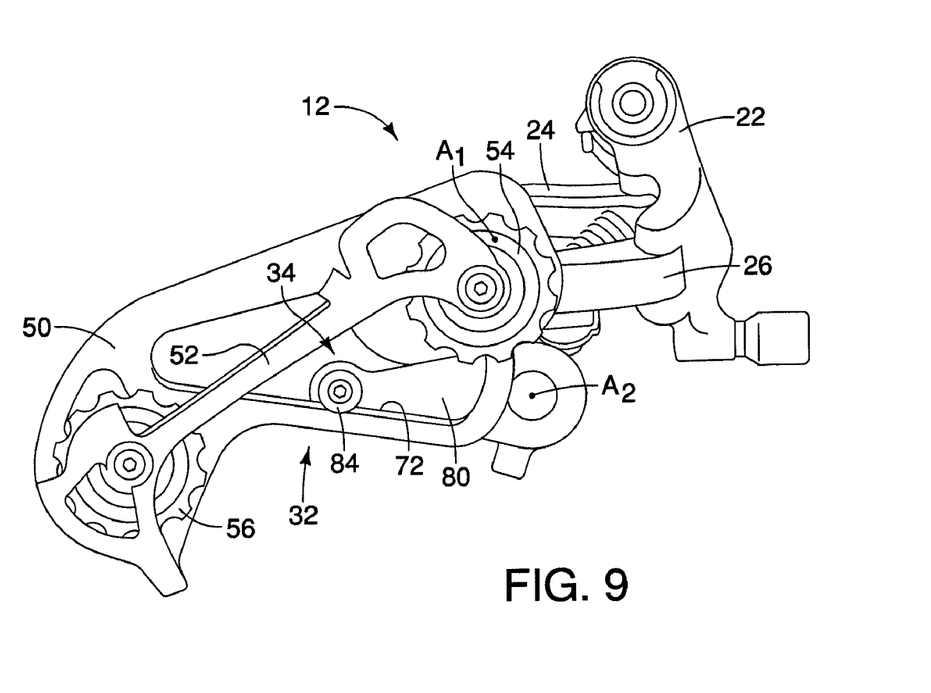
FIG. 9 is a side elevational view of the rear derailleur showing the chain guide and the chain guide tensioning mechanism is a fourth force applying position in accordance with the first embodiment of the present invention.
Figure 10:
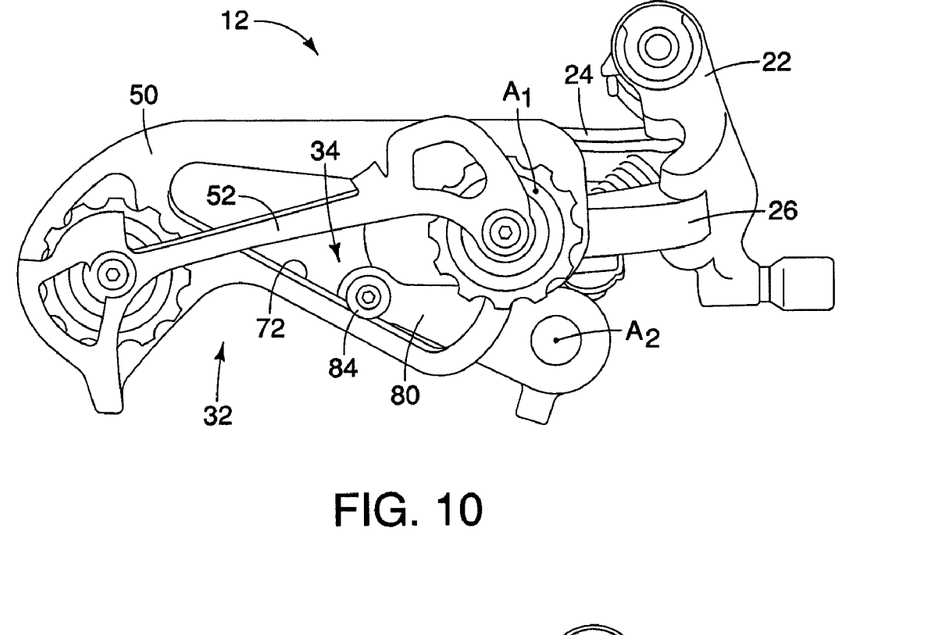
FIG. 10 is a side elevational view of the rear derailleur showing the chain guide and the chain guide tensioning mechanism is a fifth force applying position in accordance with the first embodiment of the present invention.

The differences in angular displacement can be best observed by comparing the angular displacement differences the various depictions in FIGS. 6-10. Specifically, the angular displacement of the chain guide 32 from FIG. 6 to FIG. 7 is about the same as the angular displacement of the tensioning member 80 from FIG. 6 to FIG. 7. However, when comparing the displacement difference between FIGS. 8 and 9 (or FIGS. 9 and 10), the angular displacement of the chain guide 32 from FIG. 8 to FIG. 9 (or from FIGS. 9 to 10) is greater than the angular displacement of the tensioning member 80. Hence, as the chain guide 32 is angularly displaced toward the position depicted in FIG. 10, the greater the difference in the angular displacement of the chain guide 32 compared with the tensioning member 80. Consequently, the reduced angular displacement of the tension member 80 results in a reduction of the biasing force applied by the tensioning member 80 on the chain guide 32.

Second Embodiment

Figure 11:
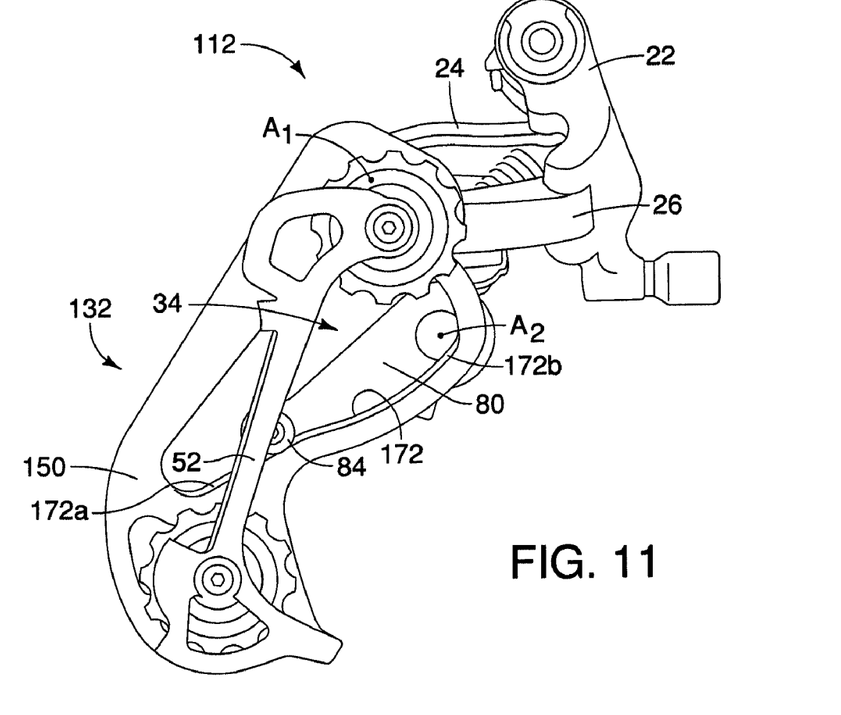
FIG. 11 is a side elevational view of a rear derailleur with a chain guide that has a contacting surface that includes a concave portion, the chain guide and chain guide tensioning mechanism shown in a first force applying position in accordance with a second embodiment of the present invention.
Figure 12:
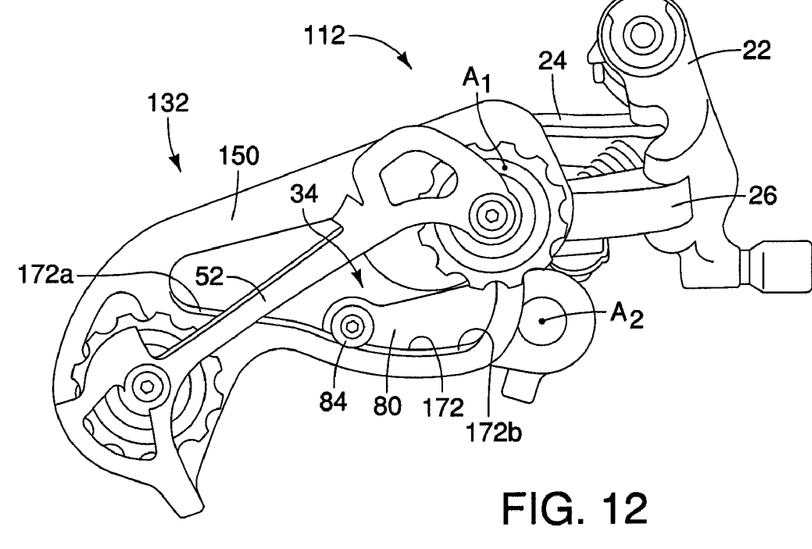
FIG. 12 is a side elevational view of the rear derailleur with the chain guide and chain guide tensioning mechanism shown in a second force applying position in accordance with the second embodiment of the present invention.

Referring now to FIGS. 11 and 12, a rear derailleur 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The rear derailleur 112 has many elements of the rear derailleur 12 of the first embodiment. For example, the rear derailleur 112 includes (among other things) the mounting member 22, the first and second linkage members 24 and 26, and the movable member 30 (not visible in FIGS. 11 and 12). However the chain guide 32 of the first embodiment has been replaced with a modified chain guide 132. The chain guide 132 includes an outer cage plate 150 and the inner cage plate 52. The outer cage plate 150 includes a contacting surface 172 that includes a straight portion (linear portion) 172a and a concave portion 172b. The chain guide tensioning mechanism 34 includes the tensioning member 80, the biasing element 82 (not visible in FIGS. 11 and 12) and the roller 84. The roller 84 rolls on the straight portion 172a and the concave portion 172b of the contacting surface 172. The biasing force applied by the tensioning member 80 is further attenuated by the concave portion 172b of the contacting surface 172. Specifically, the biasing force of the derailleur 112 is represented by the line $D_3$ in FIG. 18. The inclusion of the concave portion 172b further reduces the overall biasing force applied by the tensioning member 80 on the chain guide 132 when the chain guide 132 is displaced by a large displacement angle, such as is shown in FIG. 12.

Third Embodiment

Figure 13:
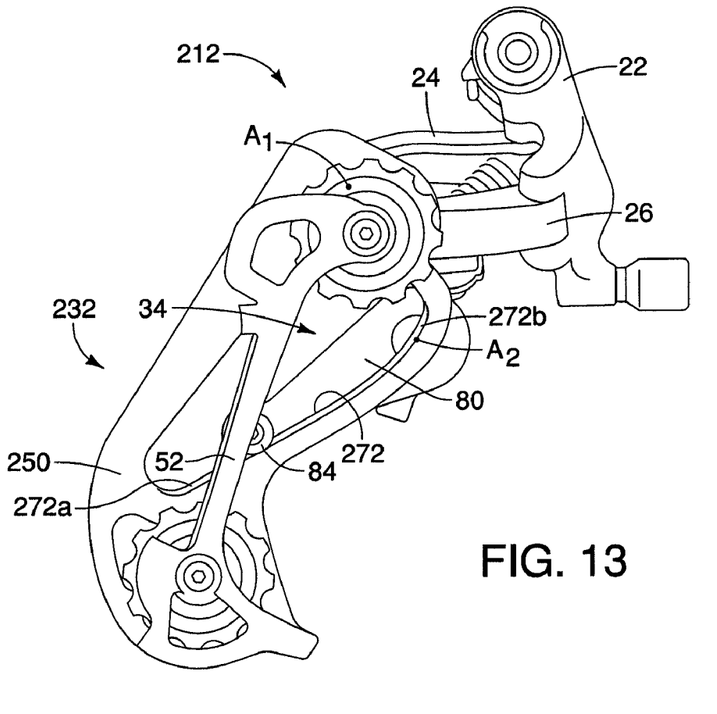
FIG. 13 is a side elevational view of a rear derailleur with a chain guide that has a contacting surface that includes a convex portion, the chain guide and chain guide tensioning mechanism shown in a first force applying position in accordance with a third embodiment of the present invention.
Figure 14:
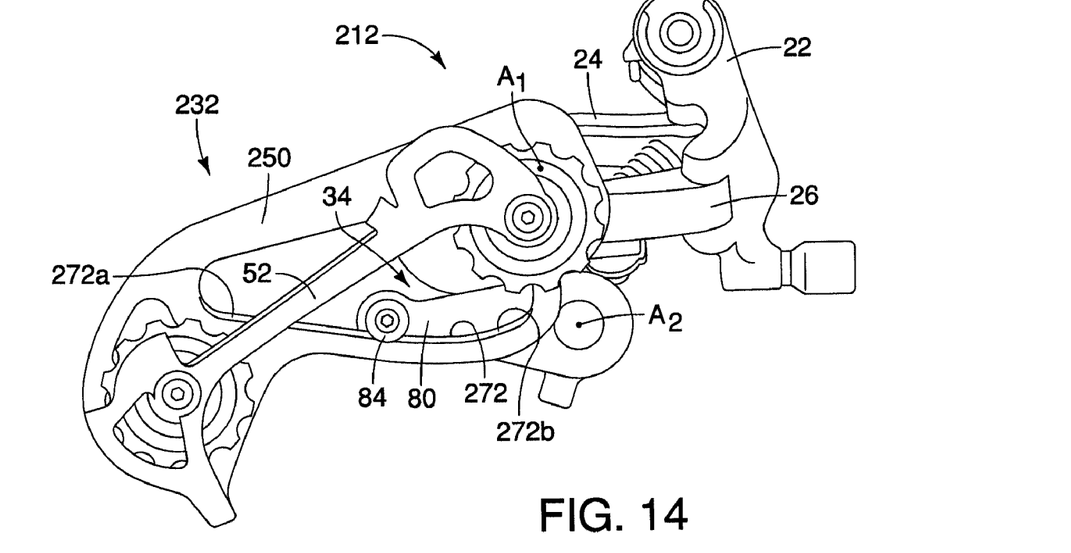
FIG. 14 is a side elevational view of the rear derailleur with the chain guide and chain guide tensioning mechanism shown in a second force applying position in accordance with the third embodiment of the present invention.

Referring now to FIGS. 13 and 14, a rear derailleur 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The rear derailleur 212 has many elements of the rear derailleur 12 of the first embodiment. For example, the rear derailleur 212 includes (among other things) the mounting member 22, the first and second linkage members 24 and 26, and the movable member 30 (not visible in FIGS. 13 and 14). However the chain guide 32 of the first embodiment has been replaced with a modified chain guide 232. The chain guide 232 includes an outer cage plate 250 and the inner cage plate 52. The outer cage plate 250 includes a contacting surface 272 that includes a straight portion (linear portion) 272a and a convex portion 272b. The chain guide tensioning mechanism 34 includes the tensioning member 80, the biasing element 82 (not visible in FIGS. 13 and 14) and the roller 84. The roller 84 rolls on the straight portion 272a and the convex portion 272b of the contacting surface 272. The biasing force applied by the tensioning member 80 is further attenuated by the convex portion 272b of the contacting surface 272. Specifically, the biasing force of the derailleur 212 is represented by the line $D_4$ in FIG. 18. The inclusion of the convex portion 272b reduces the biasing force applied by the tensioning member 80 on the chain guide 232 for moderate displacement angles, but allows the biasing force to parallel the linear displacement of the line $D_1$. In other words, a first portion of the angular displacement of the chain guide 232, the biasing force is approximately linear, in a mid-range of angular displacement, the biasing force becomes more non-linear, than for a final portion of angular displacement, the biasing force applied increases again.

As is demonstrated by the first, second and third embodiments of the present invention, the shape of the contacting surfaces 72, 172 and 272 can be changed to allow for variations in the attenuation of the displacement/force response of the biasing force applied by the tensioning member 80 on the chain guides 32, 132 and 232. Consequently, several varieties of displacement/force responses are possible.

Fourth Embodiment

Figure 15:
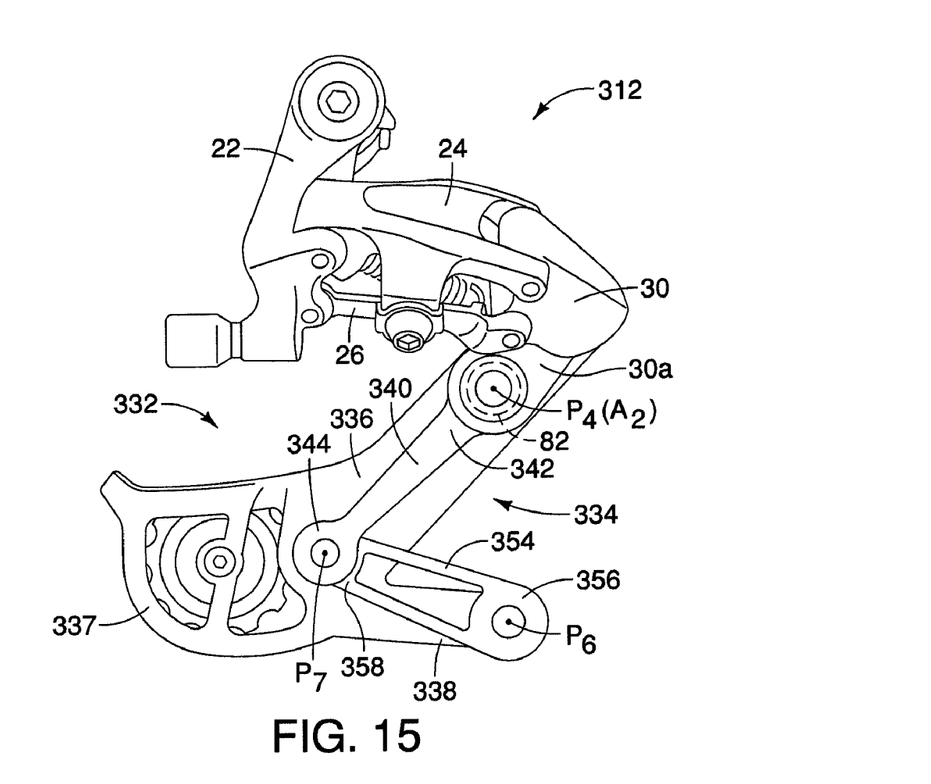
FIG. 15 is an inner side elevational view of a rear derailleur with a chain guide and chain guide tensioning mechanism shown in a first force applying position in accordance with a fourth embodiment of the present invention.
Figure 16:
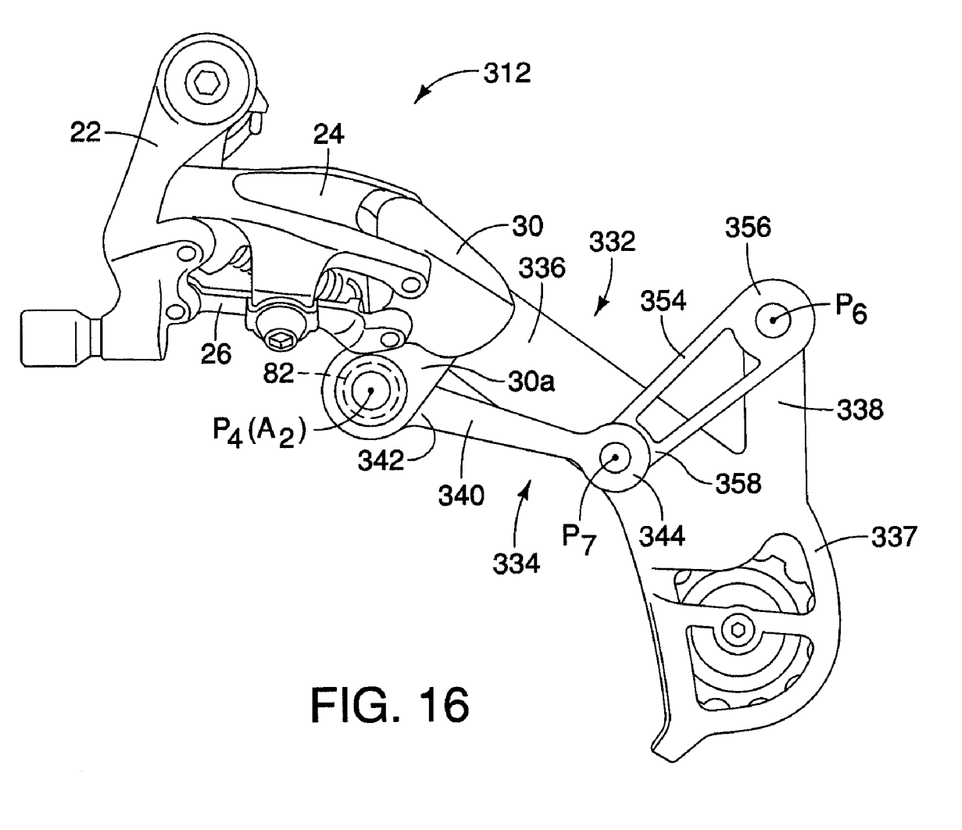
FIG. 16 is an inner side elevational view of the rear derailleur with the chain guide and chain guide tensioning mechanism shown in a second force applying position in accordance with the fourth embodiment of the present invention.

Referring now to FIGS. 15 and 16, a rear derailleur 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The rear derailleur 312 has many elements of the rear derailleur 12 of the first embodiment. For example, the rear derailleur 312 includes (among other things) the mounting member 22, the first and second linkage members 24 and 26, and the movable member 30. However the chain guide 32 and the chain guide tensioning mechanism 34 of the first embodiment have been replaced with a modified chain guide 332 and a modified chain guide tensioning mechanism 334.

The chain guide 332 includes an outer cage plate 336 and the inner cage plate 52. The outer cage plate 350 includes a tension pulley supporting portion 337 and a projecting section 338 extending from the tension pulley supporting portion 337.

The chain guide tensioning mechanism 334 includes the biasing element 82 within a tensioning support portion 30a of the movable member 30, a first tensioning member 340 and a second tensioning member 354. The first tensioning member 340 has a first portion 342 and a second portion 344. The first portion 342 is supported to the tensioning support portion 30a of the movable member 30 to pivot about the second pivot axis $A_2$ and the pivot pin $P_4$. The second portion 344 is spaced apart from the first portion 342.

The second tensioning member 354 includes a first portion 356 and a second portion 358. The first portion 356 is supported to projecting section 338 of the chain guide 332 for pivotal movement about a pivot pin $P_6$. The second portion 358 of the second tensioning member 354 is connected to the second portion 344 of the first tensioning member 340 for pivotal movement about a pivot pin $P_7$. The pivot pin $P_6$ allows for free pivotal movement of the first portion 356 of the second tensioning member 354 relative to the projecting section 338 of the outer cage plate 350. The pivot pin $P_7$ allows for free pivotal movement of the second portion 358 of the second tensioning member 354 relative to the second portion 344 of the first tensioning member 340. Hence, the chain guide 332 is biased by biasing force of the biasing element 82 (not visible) which applies a biasing force on the first tensioning member 340. The first tensioning member 340 applies that biasing force to the second tensioning member 354 and further to the outer cage plate 350 of the chain guide 332. The displacement/force response of the rear derailleur 312 is similar to that of the first embodiment represented by the line $D_2$ in FIG. 18.

It should be understood from the drawings and the description herein that the overall lengths of the first tensioning member 340, the second tensioning member 354 and the projecting section 338 of the outer cage plate 350 can be adjusted to attenuate the displacement/force response as desired. Hence many variations to the displacement/force response of the rear derailleur 312 are possible.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle derailleur comprising:
   a mounting member configured to be attached to a bicycle frame;
   at least one linkage member supported to the mounting member;
   a movable member movably coupled to the mounting member via the at least one linkage member;
   a chain guide pivotally connected to the movable member to pivot about a pivot axis extending through the movable member and supporting a guide pulley and a tension pulley; and a chain guide tensioning mechanism having a biasing element with a linear displacement and force response and a lever having a first end pivotally supported to the movable member and a second end coupled to the chain guide for movement relative to the chain guide, the biasing element applying the linear displacement and force response to the lever such that the lever biases the chain guide in a direction with biasing force of the biasing element being transmitted by the second end of the lever to the chain guide with a non-linear displacement and force response.

2. The bicycle derailleur according to claim 1, wherein the second end of the lever movably contacts the chain guide to apply the biasing force of the biasing element.

3. The bicycle derailleur according to claim 2, wherein the lever pivots about a second pivot axis that extends through the movable member, the second pivot axis being spaced apart from the pivot axis.

4. The bicycle derailleur according to claim 3, wherein the second pivot axis and the pivot axis are parallel to one another.

5. The bicycle derailleur according to claim 2, wherein the chain guide includes a contacting surface configured for contact with the second end of the lever.

6. The bicycle derailleur according to claim 5, wherein the contacting surface has a linear contour.

7. The bicycle derailleur according to claim 5, wherein the contacting surface has a non-linear contour.

8. The bicycle derailleur according to claim 5, wherein the second end of the lever includes a roller configured to movably engage the contacting surface.

9. The bicycle derailleur according to claim 1, wherein the first end of the lever is supported to the movable member to pivot about a second pivot axis spaced apart from the pivot axis and the second end is spaced apart from the first end, and the chain guide tensioning mechanism further comprising:
a second lever having a first end connected to the chain guide for pivotal movement relative to the chain guide and a second end pivotally connected to the second end of the lever.

10. The bicycle derailleur according to claim 9, wherein the chain guide includes a tension pulley supporting portion and a projecting section extending from the tension pulley supporting portion with the first end of the second lever being pivotally supported to the projecting section of the chain guide.

11. A bicycle derailleur comprising:
a mounting member configured to be attached to a bicycle frame;
at least one linkage member supported to the mounting member;
a movable member movably coupled to the mounting member via the at least one linkage member;
a chain guide pivotally supported to the movable member for pivotal movement about a first pivot axis; and
a chain guide tensioning mechanism configured to bias the chain guide in a direction about the first pivot axis, the chain guide tensioning mechanism having a lever and a biasing member, the lever having a first end and a second end, the first end being supported to the movable member such that the lever undergoes pivotal movement about a second pivot axis spaced apart from the first pivot axis, the biasing element being supported to the movable member to apply a biasing force to the lever such that the second end of the lever applies the biasing force to the chain guide.

12. The bicycle derailleur according to claim 11, wherein the second pivot axis and the pivot axis are parallel to one another.

13. The bicycle derailleur according to claim 11, wherein the biasing element is a coil spring disposed about the second pivot axis having a first end fixed relative to the movable member and a second end fixed relative to the lever.

14. The bicycle derailleur according to claim 11, wherein the chain guide includes a contacting surface configured for contact with the lever.

15. The bicycle derailleur according to claim 14 wherein the contacting surface has a linear contour.

16. The bicycle derailleur according to claim 14 wherein the contacting surface has a non-linear contour.

17. The bicycle derailleur according to claim 14 wherein the second end of the lever includes a roller supported thereto configured for rolling engagement with the contacting surface.

18. The bicycle derailleur according to claim 11, wherein the chain guide tensioning mechanism includes a second lever having a first end supported to the chain guide for pivotal movement about a pivot point on the chain guide and a second end pivotally connected to the second end of the lever.

19. The bicycle derailleur according to claim 18, wherein the chain guide tensioning mechanism includes:
the chain guide includes a tension pulley supporting portion and a projecting section that extends from the tension pulley supporting portion with the first end of the second lever being pivotally supported to the projecting section of the chain guide.

* * * * *